United States Patent Office 3,543,349
Patented Dec. 1, 1970

3,543,349
MOULD FOR USE IN AN INJECTION MOULDING PROCESS
Giuseppe Marocco, Turin, Italy, assignor to Drymit S.A., Vaduz, Liechtenstein
Original application Nov. 13, 1967, Ser. No. 682,004. Divided and this application Aug. 7, 1969, Ser. No. 848,292
Claims priority, application Italy, Mar. 10, 1967, 50,858/67
Int. Cl. B29d 3/00
U.S. Cl. 18—36   5 Claims

ABSTRACT OF THE DISCLOSURE

An article to be embedded in plastic material, having an axial inner hollow inserted on a tubular bushing slidably mounted on a stationary core projecting into an external divided mould the inner surface of which matches the outer shape of the article already embedded in plastics. The parts are so shaped as to leave a clearance between the free end of the core and one of the mould bottoms and to prevent communication between the said clearance and the other parts of the said hollow till the said bushing is withdrawn from the inner hollow of the article. The plastic material is injected into the said clearance and pushes the said bushing out of the mould, thereby allowing coating of the inner hole of the article with plastic and the flow of the latter towards the remaining parts of the mould hollow.

---

This is a divisional application from my prior application Ser. No. 682,004 filed Nov. 13, 1967, now abandoned.

This invention relates to a mould for use in an injection moulding process which is adapted to embed in plastics material an article having an axial inner hollow and is more particularly concerned with a simple and inexpensive means for enclosing all stationary components of an electromagnet within a protective and supporting casing by injection moulding without any damage to the components by the action of high pressure or objectionable displacements interfering with the operation of the resulting product.

In accordance with the invention there is provided a mould for use in an injection moulding process adapted to embed in plastics material an article having an axial inner hollow therein, comprising an inner core and an external divided mould the moulding surface of which matches the outer shape of the article, means for holding the article to be embedded in a centered position with respect to the said core comprising a bushing slidably mounted with slight friction on the said core and means for introducing plastics material, when the article is arranged within the mould, into the clearance between the ends of the core and the bottom of the mould surface facing the said ends and for preventing the plastics material from reaching the remaining portions of the mould space adapted to form the coating for the outer surface of the article, before flowing through the clearance formed between the inner wall of the inner hollow and the side wall of the said core.

Advantageously, the said article is that stationary part of an electromagnet provided with an inner hollow of cylindrical shape surrounded by a coil adapted to receive a movable armature, the said core being of cylindrical configuration.

The bushing is preferably adapted to reach into the mould hollow over a length not exceeding the length by which the core reaches into the mould, and matches in thickness the layer of plastics material to be coated on the inner hollow, and means are provided opposing movement of the said bushing in a direction towards the opening through which it has been introduced together with its supporting case.

The invention also resides in the moulding process hereinafter described.

In order that the invention may be clearly understood and readily carried into effect the same will now be described with reference to the accompanying drawings in which.

Figure 1:
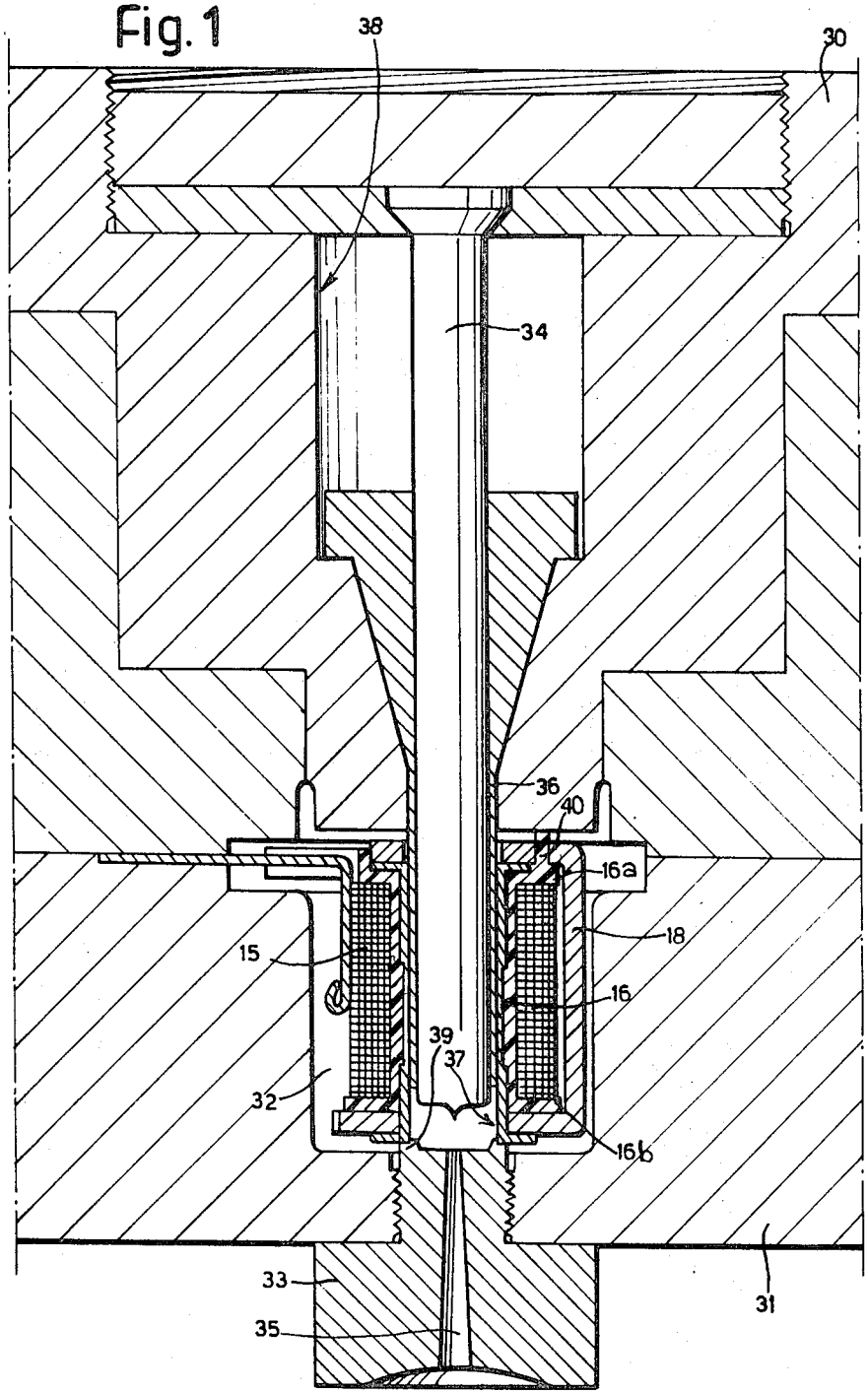
FIG. 1 is a diagrammatic sectional view of a mould for embedding the stationary parts of an electromagnet in a supporting and protecting plastics layer.

Referring to the drawings the parts of the electromagnet comprise the coils 15 and an external armature therefore 18 in the form of U shaped strap of ferromagnetic material. The whole of the exterior of the parts shown together with the lining 16 forming a spool for the coils 15 are to be coated with plastics material. Flanges 16a, 16b cover the bases of the winding 15 and prevent plastics injected from acting on the bases thereby avoiding axial deformation of the windings.

The mould for providing the plastics coating comprises two conventional external mould halves 30, 31, which on juxtaposition define a hollow 32 matching in shape the stationary part of the electromagnet in its finished coated condition.

The mould half 31 is provided with a nozzle 33 for injecting the plastics, which connects the hollow 32 with the outside. For constructional reasons the shell 30 is made of a plurality of sections which, however, behave in operation like an integral unit.

A hub 34 is secured in an overhanging relation to the mould half 30, its free end reaching within the hollow 32 and being axially aligned with the orifice of the nozzle 33. A bushing 36 is slidingly mounted with a slight friction on the hub 34 acting as the mould core, the bushing 36 matching in thickness the coating provided for the wall of the axial hole 37 in the stationary part of the electromagnet. The axial length of the bushing 36 is greater than the axial length of the stationary part, the former's outer diameter equalling the outer diameter of the hole 37.

The end of the bushing 36 remote from the nozzle 33 is enlarged and slidingly engaged by a cylindrical recess 38 in the mould half 30 to afford an accurate guide for the axial displacements of the bushing with respect to the hub 34. The nozzle 33 is provided with a stationary collar 39 encircling the hole 35 and extending inwardly on the mould so as to reach into the hollow 32 as shown by FIG. 7.

The stationary part of the electromagnet to be coated is placed into the hollow 32 by fitting it on the free and of the hub 34 through the interposition of the bushing 36.

In the closed mould condition a base portion of the stationary part of the electromagnet abuts the collar 39, the other base portion being spaced from the bottom of the recess 32 by spacers 40 provided in the said stationary part. More particularly, the spacers are in the form of dowels extending beyond an end flange 16a on the spool 16 of insulating material carrying the coil winding 15. Similar dowels are provided for centering the opposite end of the stationary part of the electromagnet to be coated with plastics.

Any displacement of the part to be coated in either an axial or a transverse direction is thereby presented.

After closing the mould plastics is injected in a molten condition through the nozzle 33.

The plastics first enters one end of the hole 37, forces the bushing 36 and displaces it in an axial position, and reaches the annular clearance between the wall of the hole 37 and stationary hub 36.

The inwardly directed radial pressure of plastics is uniformly taken up by the wall of the hole 37, the resulting force being annulled and the part to be coated not being subjected to transverse displacements.

The plastics injected after the bushing is removed from the part to be coated expands into the hollow 32 around the outer surface of the part to be coated, where pressure sinks by drawing of the plastics through the said clearance.

As injection of plastics continues, the material gradually fills the whole free space in the hollow 32 and flows towards the collar 39 which prevents backflow of the plastics towards the nozzle 33.

The portion of the part to be coated which rests on the collar 39 remains them exposed.

Figure 2:
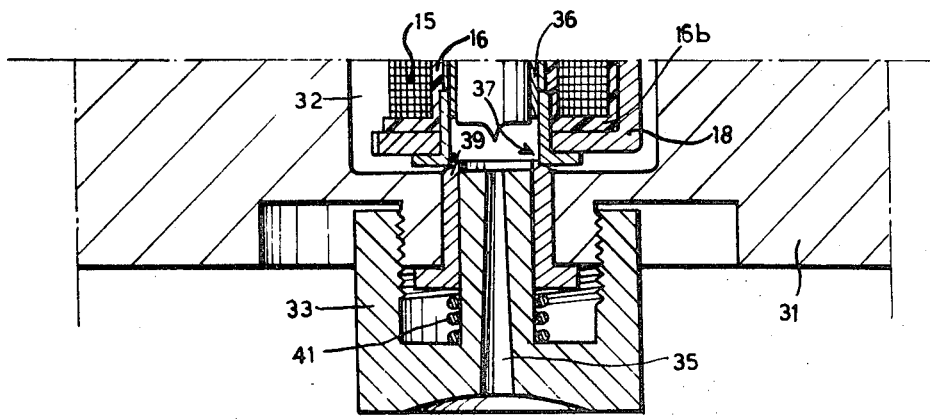
FIG. 2 is a part diagrammatical sectional view of a modified mould embodiment.

When it is desired to extend the coating to the said portion the collar 39 encircling the hole 35 is separately manufactured from the nozzle 33, FIG. 2, and is slidably mounted in an annular guide formed between the inner periphery of a through hole in the mold half 31 and outer periphery of part of the nozzle 33.

The edge of the collar 39 at the end abutted by the part to be coated is conically tapered, a spring 41 urging the collar towards the mould inside.

At the final injection step the plastics reaching the outer surface of the collar 39 enters the conical taper, forces back the collar 39 against the action of the spring 41 and covers the portion which was in contact with the collar.

What I claim is:

1. A mould for use in an injection moulding process adapted to embed in plastics material an article having an axial inner hollow therein, comprising an inner core and an external divided mould the moulding surface of which matches the outer shape of the article, means for holding the article to be embedded in a centered position with respect to the said core comprising a bushing slidably mounted with slight friction on the said core and means for introducing plastics material, when the article is arranged within the mould, into the clearance between the end of the core and the bottom of the mould surface facing the said end and for preventing the plastics material from reaching the remaining portions of the mould space adapted to form the coating for the outer surface of the article, before flowing through the clearance formed between the inner wall of the inner hollow and the side wall of the said core.

2. A mould as claimed in claim 1 for use where the article is the stationary part of an electromagnet provided with an inner hollow of cylindrical shape surrounded by a coil adapted to receive a movable armature, the said core being of cylindrical configurations.

3. A mould as claimed in claim 1 wherein the bushing is adapted to reach into the mould hollow over a length not exceeding the length by which the core reaches into the mould, and matches in thickness the layer of plastics to be coated on the inner hollow, and means are provided opposing movement of the said bushing in a direction towards the opening through which it has been introduced together with its supporting core.

4. A mould as claimed in claim 3, wherein the means for introducing the plastics into the mould comprise a nozzle provided at its end turned towards the mould with an axial flange adapted to support the part of the article introduced into the mould at the region of the said part which surrounds the axial inner hole.

5. A mould as claimed in claim 4, wherein the said axial flange is formed at the end of a bushing slidably mounted against the pressure of spring means which urge it towards the interior of the mould, the said spring means being located in an annular seat formed between the periphery of a hollow injection mould secured to the mould wall and the inner periphery of a hole formed in the said wall and surrounding the injection nozzle.

References Cited

UNITED STATES PATENTS

| 2,465,799 | 3/1949 | Gravesen. |
| 2,822,578 | 2/1958 | Lobell. |
| 3,045,290 | 7/1962 | Anderson et al. |
| 3,268,645 | 8/1966 | Stampfli _____ 181—36 X |

FOREIGN PATENTS

| 531,362 | 11/1957 | Belgium. |
| 579,752 | 8/1946 | Great Britain. |

J. SPENCER OVERHOLSER, Primary Examiner

MICHAEL O. SUTTON, Assistant Examiner

U.S. Cl. X.R.

18—30